US008042948B2

(12) United States Patent
Powell et al.

(10) Patent No.: US 8,042,948 B2
(45) Date of Patent: Oct. 25, 2011

(54) APPARATUS THAT PRODUCES A THREE-DIMENSIONAL IMAGE

(75) Inventors: Gary Powell, Palmdale, CA (US); Sam Ingraldi, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 519 days.

(21) Appl. No.: 12/212,802

(22) Filed: Sep. 18, 2008

(65) Prior Publication Data

US 2010/0066978 A1 Mar. 18, 2010

(51) Int. Cl.

*G03B 21/00* (2006.01)
*G03B 21/32* (2006.01)
*G02B 27/22* (2006.01)
*G02B 27/14* (2006.01)
*G02B 17/00* (2006.01)
*G02B 5/10* (2006.01)

(52) U.S. Cl. .......... 353/10; 359/479; 359/629; 359/858; 359/730; 352/86

(58) Field of Classification Search .................... 353/10; 359/479, 629, 858, 730; 352/86
See application file for complete search history.

(56) References Cited

U.S. PATENT DOCUMENTS 1,699,689 A * 1/1929 Curry .............................. 40/538
2,576,147 A * 11/1951 Sauvage .......................... 40/427
3,647,284 A 3/1972 Elings et al.
4,802,750 A 2/1989 Welck
5,257,130 A * 10/1993 Monroe ........................ 359/478
5,311,335 A 5/1994 Crabtree
5,311,357 A 5/1994 Summer et al.
5,394,198 A 2/1995 Janow
5,407,391 A 4/1995 Monroe et al.
5,552,934 A 9/1996 Prince
5,555,376 A 9/1996 Theimer et al.
5,687,025 A 11/1997 Nanba
6,315,416 B1 11/2001 Dominguez-Montes et al.
6,318,868 B1 * 11/2001 Larussa ......................... 359/857
6,421,182 B1 7/2002 Holden
6,478,432 B1 11/2002 Dyner
6,532,011 B1 3/2003 Francini et al.
6,612,701 B2 9/2003 Westort et al.
6,817,716 B1 * 11/2004 Hines ............................. 353/10
2008/0080058 A1 4/2008 Raymond

FOREIGN PATENT DOCUMENTS

WO WO83/03019 9/1983

OTHER PUBLICATIONS

Lytle, "Can Laser Images Float in Space?" The Laserist: Laser Show Basics/3D Effects, http://www.laserist.org/Laserist/showbasics_3D.html. 4 pages, obtained May 16, 2008.
Diehl, "Object-oriented motion estimation and segmentation in image sequences" Signal Processing: Image Communication, vol. 3, No. 1, pp. 23-56, 1991.
"About YAOX" YAOX Edutainment Group, http://www.yaox.com/YAOX/e-about-html., 4 pages, obtained Sep. 16, 2008.
Szeliski et al., "Creating Full View Panoramic Image Mosaics and Environment Maps" Microsoft Research, 8 pages.

* cited by examiner

*Primary Examiner* — Georgia Y Epps
*Assistant Examiner* — Magda Cruz
(74) *Attorney, Agent, or Firm* — Patent Ingenuity, P.C.; Samuel K. Simpson

(57) ABSTRACT

The subject matter disclosed herein relates to systems and methods for providing image projection and entertainment.

12 Claims, 7 Drawing Sheets

10
75
74
70
68
12
64
66
56
62
50
22

APPARATUS THAT PRODUCES A THREE-DIMENSIONAL IMAGE

FIELD

The subject matter disclosed herein relates to image creation, which may be applied in a field of entertainment, for example.

BACKGROUND

The entertainment field may face a challenge of presenting an observer with increasingly impressive sensory experiences. Therefore mechanisms and/or techniques for producing optical illusions and the like continue to be sought.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

An entertainment effect, which may be in an amusement park for example, may present an observer with a three-dimensional object, or bas relief, of a human face or other object. The bas relief may be illuminated using a projector projecting an image to match that of the bas relief. Such illumination may result in animating the bas relief so that it appears to be "alive". For example, an image of a face projected onto a bas relief may include lips that are moving so that the bas relief appears to be talking.

Though such an illusion of a "living" bas relief may impress and entertain an observer, a desire remains for illusions or images that are more impressive, in order to maintain a heightened level of entertainment.

In an embodiment, a projection system may provide a three-dimensional image. Such a projection system may comprise a tangible object that may include a contoured or geometrical surface. Here, a geometrical surface may include a surface of any shape, such as a sphere, a plane, a cylinder, just to name a few examples, having contours of any arrangement. Such a surface may act as either a rear projection screen or a front projection screen, which may be illuminated by a projector. In a particular embodiment, a projection system may include a contoured rear projection screen in the form of a human face of a head-shaped object. An image may be projected onto the back or front of the face to animate facial expressions for the face. Such a projection may also allow the face and/or any other portion of the head-shaped object to act as a secondary source of light. In other words, the head-shaped object, or any such tangible object being illuminated by a projector, may glow with enough intensity as to illuminate other elements or devices of a projection system. A projector may be mounted to ensure that its image remains in proper focus, alignment, and registration on the tangible object.

In a particular embodiment, a projection system may include optical elements to reflect and/or transmit light radiating from a tangible object. Such radiating light may include an image that may be projected onto a surface of the tangible object. Optical elements may then project light from the tangible object into a volume of space where an image may be created. The image may appear to an observer as a three-dimensional rendition of the tangible object suspended in space, as explained in detail below.

Figure 1A:
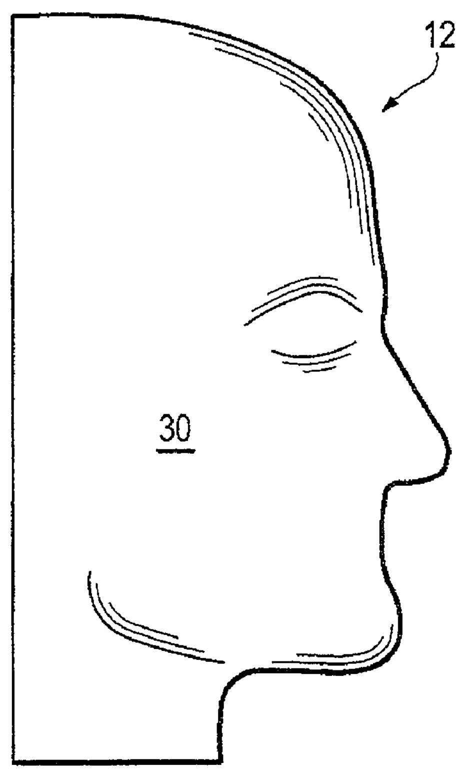
FIGS. 1A and 1B are side and back views, respectively, illustrating a tangible object, according to a particular embodiment.
Figure 1B:
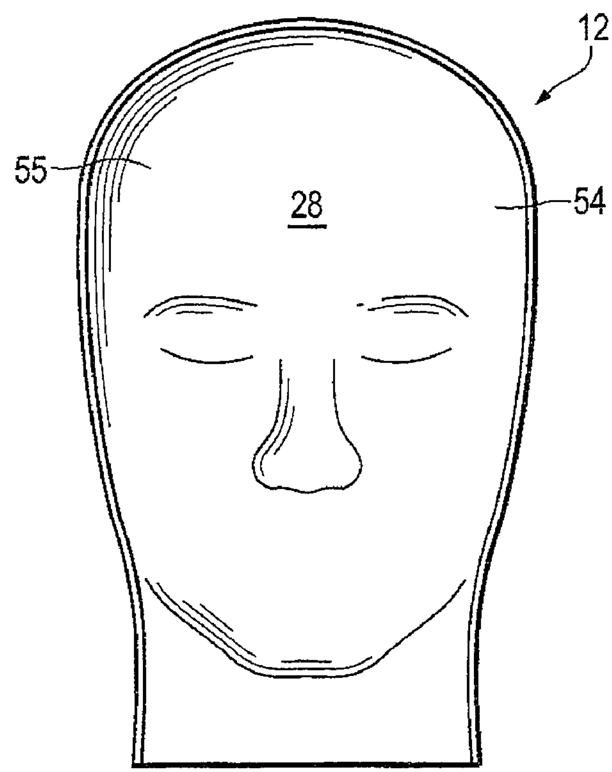

FIGS. 1A and 1B are side and back views, respectively, of a tangible object 12, in accordance with an embodiment. Of course, claimed subject matter is not limited in scope to any particular embodiment. Tangible object 12 may comprise a three-dimensional, contoured or geometrical surface. In a particular embodiment, tangible object 12 may include a convex side, a concave side, or other types of shapes to be illuminated by a projection beam, as described below. As in the embodiment shown in FIGS. 1A and 1B, tangible object 12 may comprise a model of a human head, though such features are only an example and claimed subject matter is not limited in this regard. Tangible object 12 may be incorporated in a projection system, as described below, in an amusement or theme park or other such environment to entertain and amuse patrons. In the presently-described embodiment, tangible object 12 may comprise a substantially convex front surface 30 and a substantially concave back surface 28 that defines a cavity 55.

In a particular embodiment, the physical contour of back surface 28 may conform to a general shape of a human face, for example, whose image may be pre-recorded and rear-projected onto back surface 28. Such a projected image may involve careful alignment, registration, and focus onto back surface 28. Tangible object 12 may be translucent to allow an observer to see the projected image on front surface 30. Back surface 28 may be coated with a rear-projection screen material 54 to create such translucence. For example, rear projection screen material 54 may comprise a low gain matte neutral gray coating, though other materials may be used. Such translucence may allow an observer to see an image projected onto tangible object 12 while concealing projection devices behind tangible object 12. Of course, tangible object 12 may comprise a host of different shapes and structures, and claimed subject matter is not limited in scope to any particular embodiment described herein.

In another particular embodiment, a pre-recorded image of a human face may be front-projected onto front surface 30. Tangible object 12 may be translucent or opaque to allow an observer to see the projected image on front surface 30 while concealing projection devices behind tangible object 12, for example. Again, as in the rear-projection embodiment described above, such a projected image may involve careful alignment, registration, and focus onto the face.

Although a figure of a human head has been illustrated and described, it is understood that features of the presently-described embodiments are also applicable to other figures. For example, such a figure may represent an animal, cartoon or other fictional character, or inanimate objects such as geometrical shapes, household objects, objects of nature, a globe, and various commercial products, just to name a few examples. Different parts of a human body besides the head may also be depicted. These possibilities are merely examples, and claimed subject matter is not limited in this regard.

In a particular embodiment, tangible object 12 may be molded from a clear or translucent moldable material, such as plastic, acrylic, butyrate, and PETG (glycol-modified polyethylene terephthalate), which may comprise a copolyester including a clear amorphous thermoplastic. Of course, such materials are only examples, and claimed subject matter is not so limited.

Figure 2:
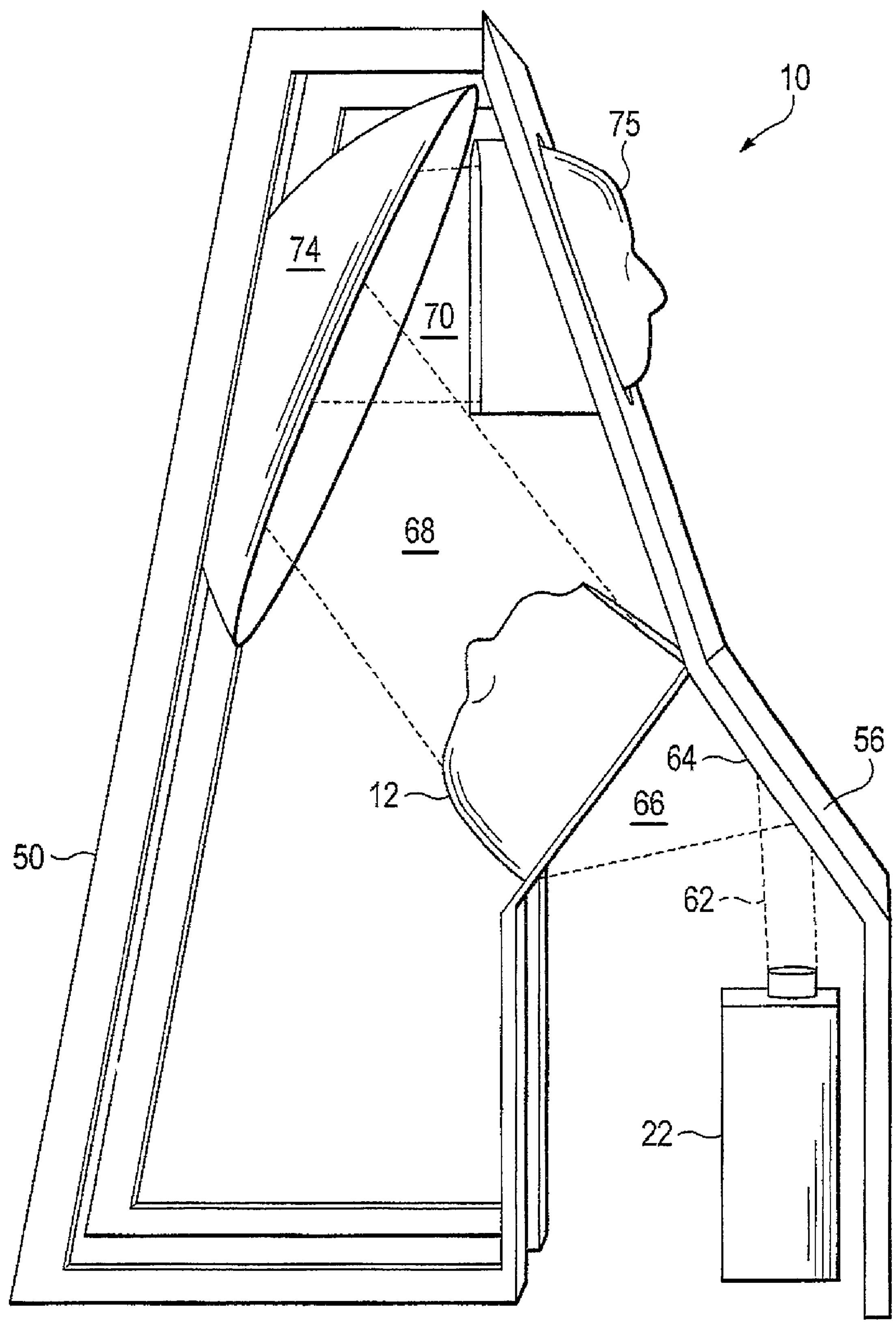
FIG. 2 is a diagram illustrating a projection system to produce an image, according to an embodiment.

FIG. 2 is a schematic view of projection system 10 to produce an image 75, according to an embodiment. A projector 22 may be configurable to rear-project an image onto tangible object 12. Projector 22 may emit a projection beam 62 onto an optical device such as mirror 64, which steers the projection beam toward the tangible object via projection beam 66. Of course, such a mirror is only an example, and projector 22 may instead be aimed so that more than one mirror, or no such mirror, may be included in projection system 10, and claimed subject matter is not limited in this respect. As a consequence of projection beam 66, front surface 30 of tangible object 12 may be illuminated via cavity 55 and back surface 28 (FIG. 1B). In the case of a human face, for example, such illumination by the projected beam may provide animated facial expressions to front surface 30. Here, such animation may include facial expressions to impart motion and/or activity, for example. Translucence of tangible object 12 mentioned above may allow a rear-projected image to be seen from in front of front surface 30, on a side opposite to cavity 55.

In an embodiment, an image projected from projector 22 may comprise video, a photo, or a computer-generated image comprising a face of a person, an animal, a cartoon character, or other such figure to animate a facial expression of tangible object 12, which may correspondingly comprise a bas relief of a human head. In a particular embodiment, such video or computer-generated image may be generated in real-time via a live feed from a video camera, as explained in detail below. In another particular embodiment, an image projected from projector 22 may comprise video or a computer-generated image of a world map, for example. In such a case, tangible object 12 may correspondingly comprise an inanimate object such as a globe, for example. In yet another particular embodiment, a recorded image may simply be provided to projector 22 with a relatively small amount of processing of image data. In other embodiments, image data may be manipulated and processed for a particular visual effect. For example, image data may be processed to selectively stretch or compress an image to provide registration and/or focus of the image to conform to back surface 28 (FIG. 1B). In another particular embodiment, an image projected from projector 22 may comprise a still image, such as an image of a human face, for example. In yet another particular embodiment, projector 22 may merely act as a lamp to illuminate tangible object 12. It is noted that these examples are provided merely for purposes of explanation and that claimed subject matter is not so limited.

In an embodiment, light 68 from tangible object 12 may impinge on optical device 74, which may be reflective and/or transmissive. In the presently-described embodiment of FIG. 2, optical device 74 may comprise a parabolic mirror, though other mirror shapes are possible, such as flat, curved, spherical, cylindrical, faceted, and so on. Optical device 74 may also comprise complex optical devices, such as a liquid crystal display (LCD), fly's eye lens, a digital mirror device (DMD) or other array of multiple mirrors, or a flexible foil mirror such as Mylar®, just to name a few examples of various optical devices that can provide particular transmission and/or reflection. Optical device 74 may also include a single or multi-layer thin film coating, such as an anti-reflection coating or band-pass filter, just to name a few examples. Optical device 74 may be coupled to a rear portion of frame 50. In a particular embodiment, the shape, orientation, and/or position of optical device 74 may be changeable and modified during operation of projection system 10. For example, various portions of optical device 74 may be affixed to one or more piston-type actuators that may change a projection distance between optical device 74 and front surface 30. Other methods of modifying the shape of an optical device 74 may include one or more piezoelectric actuators, gear-actuated pistons, or any such mechanical device to push/pull at least a portion of optical device 74. Such modification may be useful, for example, to change characteristic and/or quality of image 75, such as focus or depth of focus for example, or to adjust an operation of projection system 10.

Optical beam 70 may be produced as a result of light 68 interacting with, or in the case of the presently-described embodiment, reflecting from, optical device 74. Depending at least in part on the nature of optical device 74, image 75 may be produced in a region downstream of the optical device. In the case of the presently-described embodiment, image 75 may be produced in a focal region of optical device 74, which may comprise a parabolic mirror. Accordingly, an observer positioned in front of projection system 10 may perceive image 75 as a three-dimensional rendition of tangible object 12. Such perception will be explained in detail below. A shield 56 may be strategically placed over frame 50 to conceal projection system 10, while allowing a substantially unobstructed view of image 75.

In an embodiment, tangible object 12 and projector 22 may be supported by frame 50. In a particular embodiment, frame 50 may be coupled to a motion device (not shown) to move tangible object 12 in various directions. To imitate a normal human head capable of pivoting in various directions relative to the rest of the body, a motion device likewise may pivot frame 50 and image 75 in various directions. Such movement of frame and image may be modified by a computer program in conjunction with various pneumatic and/or hydraulic systems (not shown), for example. In a particular embodiment, tangible object 12 may comprise a shape that is changeable and modified during operation of projection system 10. For example, various portions of front surface 30 may be affixed to one or more piston-type actuators that may change a projection distance between optical device 74 and one portion of front surface 30 relative to another portion. In the case of a human face, for instance, the nose may be lengthened or shortened. Other methods of modifying the shape of tangible object 12 may include one or more piezoelectric actuators, gear-actuated pistons, or any mechanical device to push/pull such portions of tangible object 12. In another particular embodiment, position and/or orientation of tangible object 12 may be changeable and modified during operation of projection system 10 by similar methods described above. Such modification may be useful, for example, to change character and/or quality of image 75, or to adjust an operation of projection system 10. Of course, a host of different configurations are possible for projection system 10, and claimed subject matter is not limited in scope to any particular configuration, method, or approach.

In another embodiment, one or more optical elements, such as spectral filters, neutral density (ND) filters, lenses, mirrors, or screens, just to name a few examples, may be placed at least partially in an optical path between projector 22 and image 75, including projection beam 66, light 68 and/or optical beam 70, for example. Such placement may provide an ability to modify the character and/or quality of image 75, or to adjust an operation of projection system 10.

Figure 3:
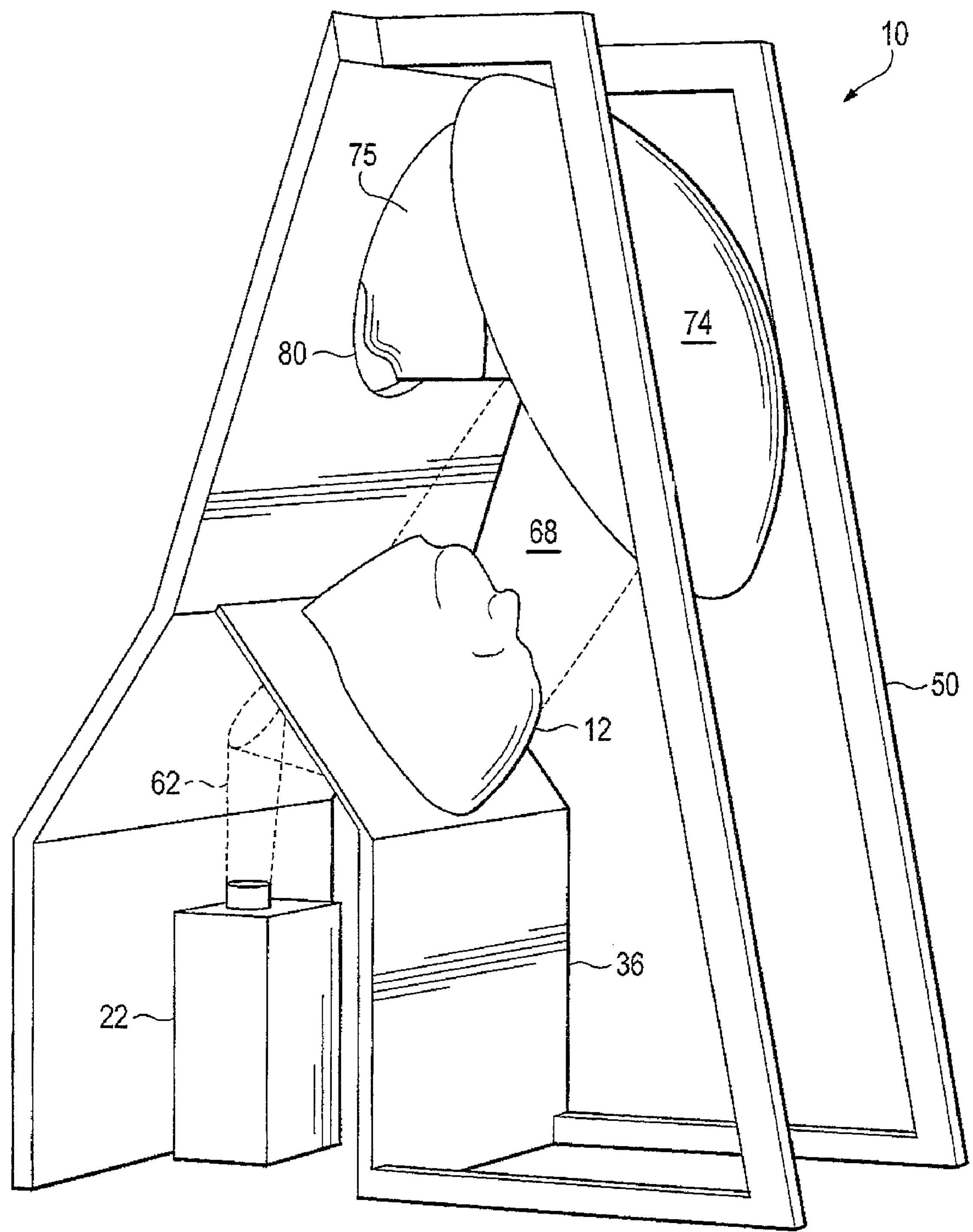
FIG. 3 is a perspective view illustrating a projection system, according to an embodiment.

FIG. 3 is a perspective view of a projection system, such as projection system 10 shown in FIG. 2 for example, according to an embodiment. Projector 22 may illuminate tangible object 12 via projection beam 62. Object frame 36 may support tangible object 12 while providing an aperture for projection beam 62. In a particular embodiment, object frame 36 may be coupled to frame 50. An illuminated tangible object 12 may radiate light 68 towards optical device 74, which may reflect or transmit light 68 about an optical axis through a viewing aperture 80 to a focal region of optical device 74, where an image 75 may form. Such an image may appear three-dimensional to an observer positioned in front or to the sides of image 75.

Figure 4:
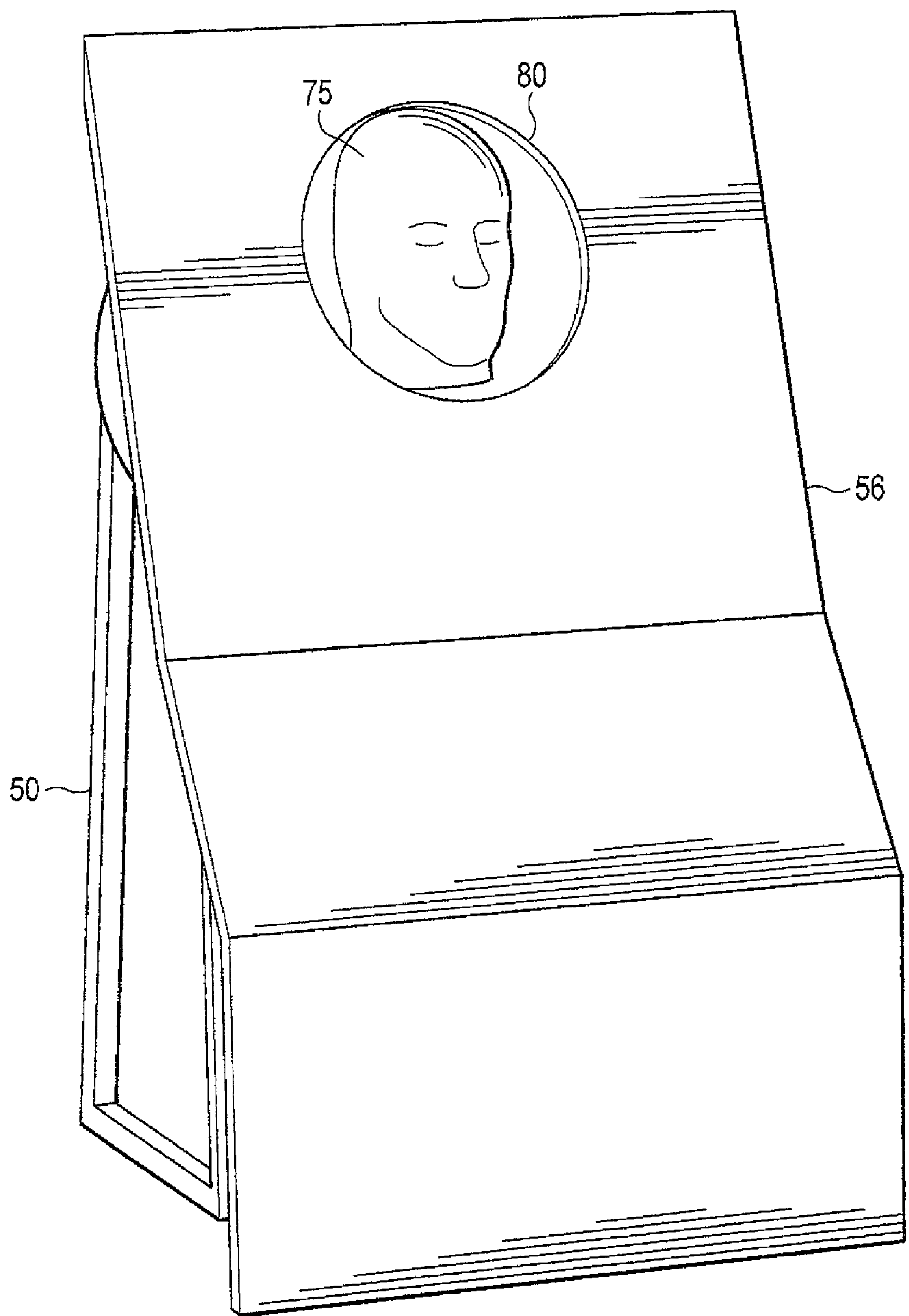
FIG. 4 is a perspective view illustrating a projection system from where an observer of an image may be positioned, according to an embodiment.

FIG. 4 is a perspective view of a projection system from where an observer of an image, such as image 75 produced by projection system 10 for example, may be positioned, according to an embodiment. Image 75 may be substantially centered in viewing aperture 80 positioned in shield 56. In addition to physically protecting the projection system, shield 56 may make it less likely that such an observer will see substantial portions of the projection system so that the observer's attention may primarily focus on image 75.

In a particular embodiment, a projection system 10 may produce image 75 comprising a three-dimensional image rendition of tangible object 12, appearing to an observer to be touchable. The observer may perceive the image as though it is a real object suspended in space. Such a three-dimensional image may provide multiple side views to an observer positioned proximal to a side of the image, and a front view to an observer positioned proximal to a front of the image. For example, an observer moving from one side of image 75, across the front, and to the other side of image 75 may observe features of such a three-dimensional image transitioning into and out of view, similar to viewing a real three-dimensional object. In addition, features of image 75, whether three-dimensional or not, may change in accordance with an image projected onto tangible object 12 from projector 22. For example, projector 22 may project onto tangible object 12 a video of a human face that appears to be talking, as indicated by moving lips. Correspondingly, tangible object 12 may comprise a bas relief of a human head. A resulting image 75 may comprise a three-dimensional image of a human head that appears to be talking. In another example, projector 22 may project onto tangible object 12 a video of a world map, perhaps including clouds and other worldly features, that appears to be spinning. Correspondingly, tangible object 12 may comprise a bas relief of a world globe. A resulting image 75 may comprise a three-dimensional image of a world globe that appears to be spinning. In yet another example, projector 22 may project a still image onto tangible object 12, such as a photo that corresponds to tangible object 12. For instance, a still image of a particular human face may be projected onto a bas relief of a human head. Such a still image may comprise a snapshot of the face of an observer of an image 75 produced by projection system 10. As a result, image 75 may comprise a three-dimensional image of the observer's face as it appeared moments before, for example.

In an embodiment, an image, such as image 75 produced by projection system 10 for example, may comprise a real image. In particular, such an image may comprise a three-dimensional real image projection reflected in a shape of a contoured surface, as explained above. As defined herein, such a real image may comprise a representation of an actual object formed by rays of light passing through the image. In a particular implementation, image 75, comprising a real image, may include a representation of a projected image onto tangible object 12 formed by rays of light passing through image 75.

In an embodiment, optical device 74 may be interchangeable to change the character of image 75. In a particular implementation, as mentioned above optical device 74 may comprise a parabolic mirror, a flat mirror, a spherical mirror, and/or a cylindrical mirror, just to name a few examples. Each mirror shape may produce a characteristic image 75 and location of image 75. For example, if optical device 74 comprises a flat mirror, then image 75 may comprise a three-dimensional image that appears to an observer to be located behind the flat mirror.

Figure 5:
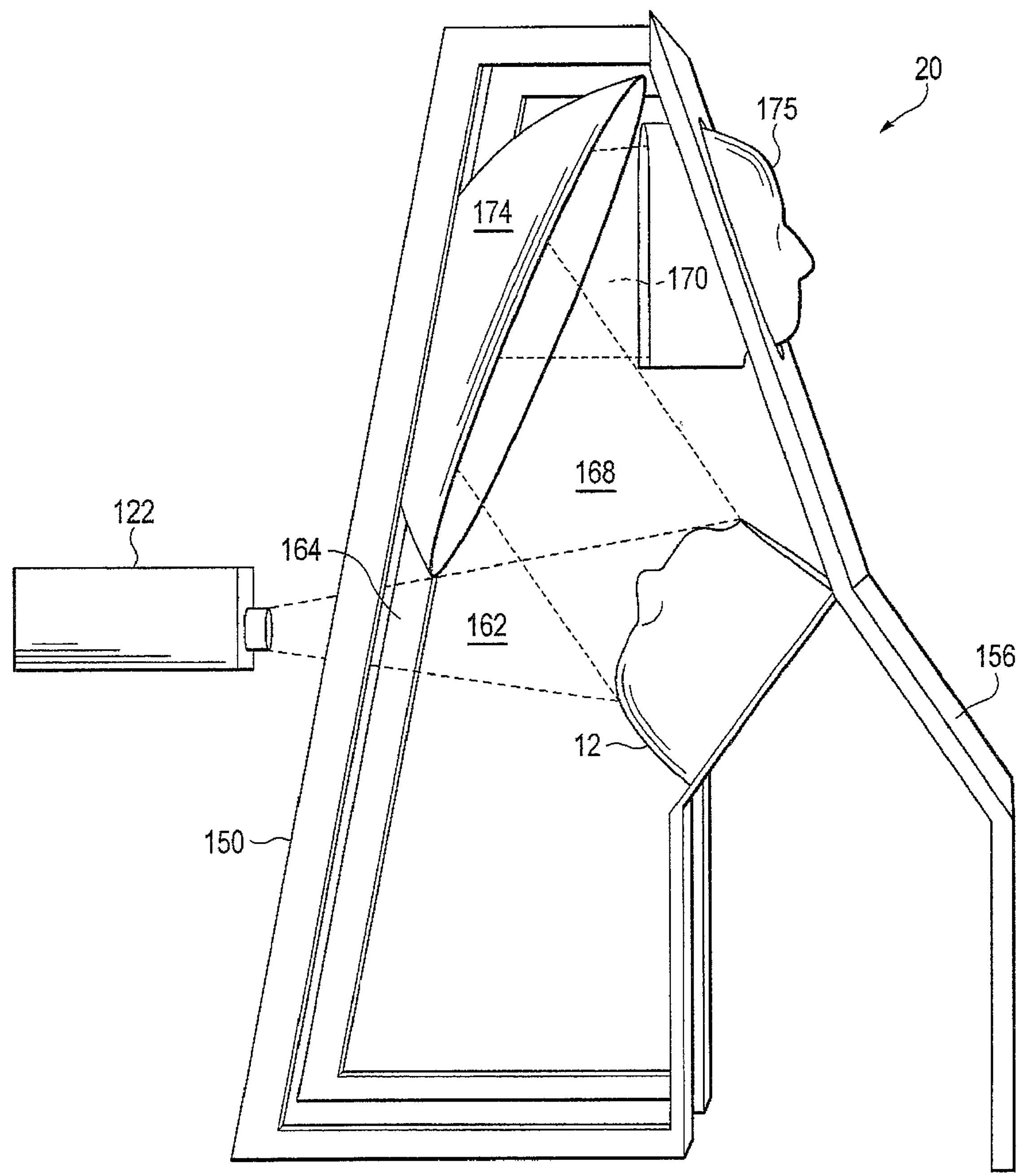
FIG. 5 is a diagram illustrating a projection system, according to another embodiment.

FIG. 5 is a schematic view of projection system 20, according to an embodiment. A projector 122 may front-project an image onto tangible object 12. In one particular implementation, projector 122 may emit a projection beam 162 directly onto tangible object 12. In another particular implementation, projection beam 162 may interact with one or more optical elements such as mirrors and/or lenses (not shown), which may be used to steer the projection beam toward the tangible object. Here, such an interaction may include reflection and/or transmission. Frame 150 may comprise a window or opening 164 to allow projection beam 162 to reach tangible object 12. Consequently, front surface 30 (FIG. 1A) may be illuminated by projection beam 162. In the case of a human face, for example, such illumination by the projected beam may provide animated facial expressions to front surface 30. Tangible object 12 may comprise a material that reflects and/or scatters light of the projected beam so that the tangible object reradiates light 168 in a direction substantially toward optical device 174. As for the case of optical device 74 described above, optical device 174 may comprise lenses and/or mirrors that are flat, parabolic, and spherical, just to name a few examples. Optical device 174 may also include a single or multi-layer thin film coating, such as an anti-reflection coating or band-pass filter, just to name a few examples. Optical beam 170 may be produced as a result of light 168 interacting with, or in the case of the presently described embodiment, reflecting from, optical device 174. Depending at least in part on the nature of optical device 174, an image 175 may be produced in a region downstream of the optical device. In the case of the presently-described embodiment, image 175 may be produced in a focal region of optical device 174, which may comprise a parabolic mirror. Accordingly, an observer positioned in front of projection system 20 may perceive image 175 as a three-dimensional object, as explained above. A shield 156 may be strategically placed over frame 150 to conceal projection system 20, while allowing a substantially unobstructed view of image 175.

Figure 6A:
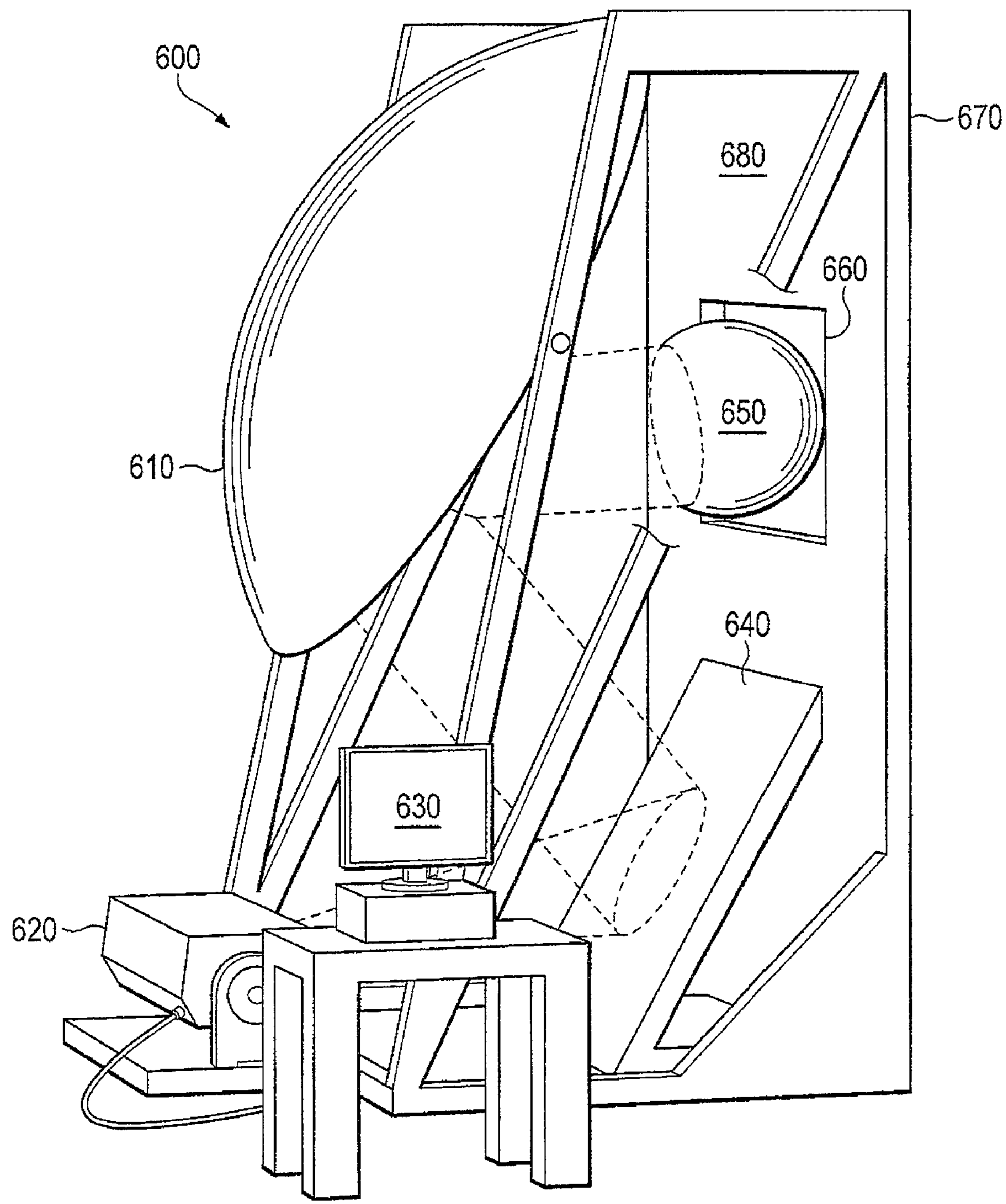
FIGS. 6A and 6B are diagrams illustrating a projection system, according to another embodiment.
Figure 6B:
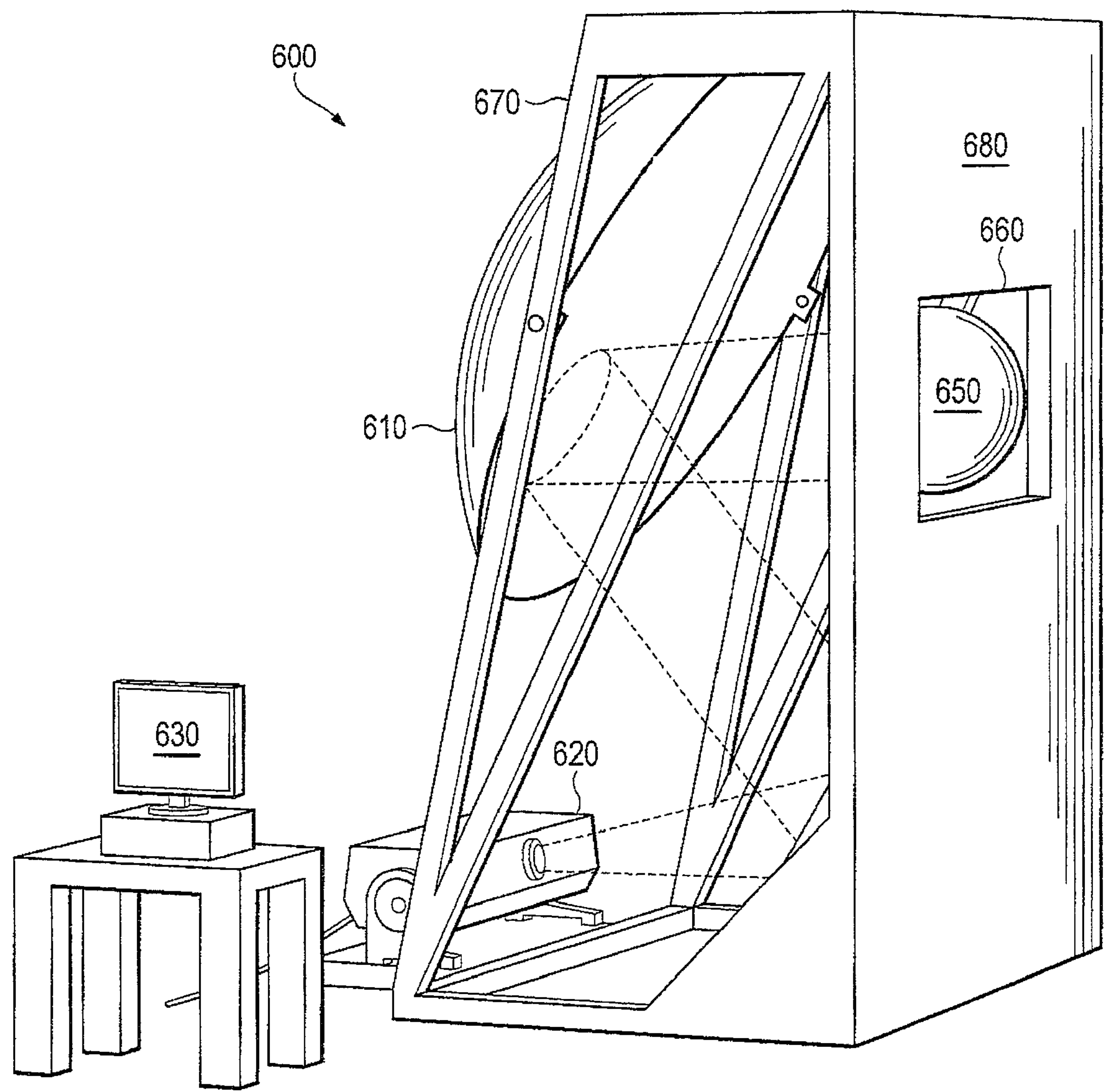

FIGS. 6A and 6B are schematic views of a projection system 600, according to another embodiment. A projection device 620 may project an image onto a screen 640. Such a projection device may include a laser, such as a red-green-blue (RGB) laser. In one particular implementation, a laser may be scanned, for example, using a computer and/or processor 630, to produce an image including a still image and/or a video image. Such scanning may provide a computer-generated image (CGI) projected onto screen 640. In a particular embodiment, though an image comprising CGI may have been produced by three-dimensional modeling, for example, an image projected onto screen 640 may comprise a two-dimensional image. Laser scanning may involve modulating a signal to be received by a laser to modify the laser's emission intensity and/or wavelength. In another particular implementation, projection device 620 may comprise an emissive device such as a CRT monitor, an LCD monitor, a plasma screen, and/or a projector, just to name a few examples. In yet another particular implementation, such an emissive device may be placed in a location where screen 640 would otherwise be, thus replacing screen 640. In this implementation, projection device 620, being an emissive device such as a monitor, may behave like screen 640 to provide an image to optical device 610, as explained below.

Screen 640 may comprise a material that reflects and/or scatters light projected onto the screen to re-radiate projection light in a direction substantially toward optical device 610. Examples of such a screen may include painted foam core material, paneling, and/or a material that is able to reflect and/or scatter light projected onto it. As for the case of optical device 74 described above, optical device 610 may comprise lenses and/or mirrors that are flat, curved, parabolic, cylindrical, and/or spherical, just to name a few examples. Optical device 610 may also include a single or multi-layer thin film coating, such as an anti-reflection coating or band-pass filter, just to name a few examples. An image 650 may be produced as a result of light interacting with, or in the case of the presently described embodiment, reflecting from optical device 610. Such interacting light may be from light scattered and/or reflected from screen 640, or light from an emissive device placed where screen 640 would otherwise be, for example. Depending at least in part on the nature of optical device 610, image 650 may be produced in a region, such as aperture 660, downstream of the optical device. In the case of the presently-described embodiment, image 650 may be produced in a focal region along an optical axis of optical device 610, which may comprise a parabolic mirror, for example. Accordingly, an observer positioned in front of projection system 600 may perceive image 650 as a three-dimensional object that appears to float in the region between the observer and the optical device 610. A shield 680 may be strategically placed over frame 670 to conceal projection system 600, while allowing a substantially unobstructed view of image 650 in aperture 660, for example.

In an embodiment, an observer viewing an image, such as an image 75 produced by projection image 10 shown in FIG. 4 for example, may be concurrently filmed by one or more cameras to combine a live image of the observer's face with the image. In a particular example, a first camera may be located in front of the observer's face to film the front of the face. A second camera may be located at a particular angle to the right of the face to film an oblique view of the right side of the face. A third camera may be located at a particular angle to the left of the face to film an oblique view of the left side of the face. Of course, any other configuration of one or more cameras may be used, and claimed subject matter is not limited in this regard. Output signals from multiple cameras may be combined and digitally processed for alignment and stabilization, for example. Resulting image data may be merged together using image processing software, of which there is a variety available from a variety of vendors. Such software may be used to create a warp mesh to distort the merged image to conform to the shape and size of a facial expression of a tangible object 12, such as tangible object 12 shown in FIG. 1A. The merged image may be further processed using the warp mesh for alignment of major features of the observer's face, such as the eyes, nose, and mouth, for example. An image resulting from such a process may be moving or still. In a particular embodiment, computer-generated graphics may be used to create an image for projection by projector 22, for example. Such images and a live image of an observer's face, for example, may be combined or used sequentially to morph a live action image into a computer generated image.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

One skilled in the art will realize that an unlimited number of variations to the above descriptions is possible, and that the examples and the accompanying figures are merely to illustrate one or more particular implementations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

It will, of course, also be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware or as any combination of hardware, software, or firmware, for example. Likewise, although claimed subject matter is not limited in scope in this respect, one embodiment may comprise one or more articles, such as a storage medium or storage media. This storage media, such as, one or more CD-ROMs or disks, for example, may have stored thereon instructions, that if executed by a system, such as a computer system, computing platform, or other system, for example, may enable an embodiment in accordance with claimed subject matter to be executed, such as one of the embodiments previously described, for example. As one potential example, a computing platform may include: one or more processing units or processors; one or more input/output devices, such as a display, a keyboard, or a mouse; one or more memories, such as static random access memory, dynamic random access memory, flash memory or a hard drive, although, again, claimed subject matter is not limited in scope to this example.

What is claimed is:

1. An apparatus comprising:

a tangible object having a contoured or geometrical surface, said tangible object comprising a convex side, at least a portion of said convex side positioned to be reflected as a three-dimensional image, at least a portion of said convex side positioned to be illuminated with a projection;

a device operable to emit said projection onto said contoured or geometrical surface of said tangible object; and an optical device operable to produce said three-dimensional image comprising said projection in a shape of said contoured or geometrical surface.

2. The apparatus of claim 1, wherein at least a portion of said tangible object is positioned to be reflected as said three-dimensional image and positioned to be illuminated with said projection.

3. The apparatus of claim 1, wherein said optical device comprises:

a frame having a shield and a rear portion, said shield defining a viewing aperture, wherein said optical device is coupled to said rear portion of said frame, said optical device defines an optical axis, said optical axis is aligned with and extends out of said viewing aperture, and said tangible object is aligned with said optical axis so that said three-dimensional image is projected through said aperture.

4. The apparatus of claim 3, wherein said device projects through an opening in said rear portion of said frame to illuminate said convex side of said tangible object.

5. The apparatus of claim 1, wherein said three-dimensional image comprises a real image.

6. The apparatus of claim 5, wherein said optical device comprises a curved mirror.

7. The apparatus of claim 1, wherein said optical device comprises a mirror.

8. The apparatus of claim 7, wherein said optical device comprises a parabolic or spherical mirror.

9. The apparatus of claim 1, wherein said optical device comprises at least one of the following: a liquid crystal display (LCD), a fly's eye lens, a digital mirror device (DMD), and a flexible foil mirror.

10. An apparatus comprising:

a tangible object having a contoured or geometrical surface, wherein said tangible object comprises a concave side, at least a portion of said concave side positioned to be reflected as a three-dimensional image, at least a portion of said concave side positioned to be illuminated with a projection;

a device operable to emit said projection onto said contoured or geometrical surface of said tangible object; and an optical device operable to produce said three-dimensional image comprising said projection in a shape of said contoured or geometrical surface.

11. An apparatus comprising:

a tangible object having a contoured or geometrical surface, wherein said tangible object comprises a concave side and a convex side opposite said concave side, said tangible object comprising a translucent material, at least a portion of said convex side adapted to be reflected as a three-dimensional image, at least a portion of said concave side positioned to be illuminated with a projection;

a device operable to emit said projection onto said contoured or geometrical surface of said tangible object, said device operable to provide a rear projection of said projection onto said concave side; and an optical device operable to produce said three-dimensional image comprising said projection in a shape of said contoured or geometrical surface.

12. The apparatus of claim 11, wherein said optical device comprises:

a frame having a shield and a rear portion, said shield defining a viewing aperture, wherein said optical device is coupled to said rear portion of said frame, said optical device defines an optical axis, said optical axis is aligned with and extends out of said viewing aperture, said tangible object is located between said device and said optical device, said convex side of said tangible object extends toward said optical device, and a real image of said tangible object is reflected by said optical device to project said three-dimensional image through said aperture.

* * * * *